UNITED STATES PATENT OFFICE.

RUDOLPH NIETZKI, OF BASLE, SWITZERLAND, ASSIGNOR TO THE FARB-WERKE, VORMALS MEISTER, LUCIUS & BRÜNING, OF HÖCHST-ON-THE-MAIN, GERMANY.

YELLOW COLORING-MATTER.

SPECIFICATION forming part of Letters Patent No. 555,658, dated March 3, 1896.

Application filed January 11, 1895. Serial No. 534,578. (Specimens.)

*To all whom it may concern:*

Be it known that I, RUDOLPH NIETZKI, a citizen of the Empire of Germany, and a resident of Basle, in the Republic of Switzerland, have invented certain new and useful Improvements in the Production of Yellow Coloring-Matter, of which the following is a specification.

The monosulfonic acids of beta-diazonaphthalene of the formula

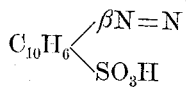

can be combined with salicylic acid to yellow azo-dye-stuffs, which excel by their affinity for chromium mordants. For the purpose of obtaining the dye-stuffs the mixture of the isomeric sulfonic acids which results by treating beta-naphthylamin with sulfuric acid may be employed, as also the different isomers alone, preferably the acid of the $2:8 \atop NH_2:SO_3H$ position. These dye-stuffs produce colors very fast to milling and light on wool mordanted with chromium mordants, and can be combined as desired with the wood-dyes used for this purpose, as also with alizarin dyes.

Example: 24.6 kilograms of beta-naphthylamin monosulfonate of sodium 2:8, (anhydrous,) are dissolved in five hundred liters of water and the solution is mixed with twenty-five kilograms of hydrochloric acid of 20° Baumé, (or with the equivalent quantity of sulfuric acid.) To the solution, which is kept cool, a five-per-cent. solution sodium nitrite (about seven kilograms) is gradually added, while stirring, until a drop of the mixture turns iodid of potassium and starch-paper blue. The liquid which contains the beta-diazonaphthalene sulfonic acid in suspension is allowed to run gradually, while stirring, into a solution of fourteen kilograms of salicylic acid and twenty kilograms of calcined soda in about three hundred liters of water, and after some hours the dye-stuff thus formed is precipitated with salt.

The dye-stuff is a powder of a yellow-brown color, difficultly soluble in cold water, petroleum and benzene, easily soluble in hot water. It produces pure yellow shades with alum mordant and olive-yellow shades, very fast to milling, with chromium mordants. It dissolves in concentrated sulfuric acid with a dark orange-red color.

What I claim as my invention is—

1. The process herein described for producing a yellow dye-stuff, which consists in combining the monosulfonic acids of beta-diazonaphthalene with salicylic acid, substantially as described.

2. As a new article of manufacture, a yellow dye-stuff consisting of a powder of yellow-brown color, difficultly soluble in cold water, petroleum and benzene, readily soluble in hot water, dissolving in concentrated sulfuric acid with a dark orange-red color, and producing pure yellow shades with alum mordant and olive-yellow shades with chromium mordant, substantially as described.

In testimony that I claim the foregoing as my invention I have signed my name in presence of two subscribing witnesses.

RUDOLPH NIETZKI.

Witnesses:
GEORGE GIFFORD,
FALCONER CROWE.